(12) United States Patent
Ihn et al.

(10) Patent No.: US 8,055,455 B2
(45) Date of Patent: Nov. 8, 2011

(54) DECOMPOSITION MODE MATCHING CHANGE INDEX

(75) Inventors: Jeong-Beom Ihn, Bellevue, WA (US); James Patrick Dunne, Ballwin, MO (US); Lawrence E. Pado, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 289 days.

(21) Appl. No.: 12/135,591

(22) Filed: Jun. 9, 2008

(65) Prior Publication Data

US 2009/0306907 A1 Dec. 10, 2009

(51) Int. Cl.
*G06F 19/00* (2011.01)
(52) U.S. Cl. ......................................................... 702/34
(58) Field of Classification Search ....................... 702/34
See application file for complete search history.

(56) References Cited

U.S. PATENT DOCUMENTS

| | | | |
|---|---|---|---|
| 6,484,132 B1 | 11/2002 | Hively et al. | |
| 7,324,193 B2 * | 1/2008 | Lally et al. | 356/237.2 |
| 7,374,539 B2 | 5/2008 | Fernando et al. | |
| 7,487,059 B2 | 2/2009 | Davis et al. | |
| 7,552,027 B2 | 6/2009 | Kearns et al. | |

OTHER PUBLICATIONS

Gyuhae Park, Overview of Piezoelectric Impedance-Based Health Monitoring and Path Forward, The Shock and Vibration Digest, vol. 35, No. 6, Nov. 2003 451-463.*
Narayan Kovvali, Time-frequency based classification of structural damage, Apr. 26, 2007, p. 1-11.*
Wang et al., "A synthetic time-reversal imaging method for structural health monitoring", Insitute of Physics Publishing, Smarter Materials and Structures 13 (2004), U.K., pp. 415-423.
U.S. Appl. No. 11/840,427, filed Aug. 17, 2007, Ihn.

* cited by examiner

*Primary Examiner* — Tung S Lau
(74) *Attorney, Agent, or Firm* — Yee & Associates, P.C.

(57) ABSTRACT

A method, apparatus, and computer usable program code for identifying change indices for a structure. In one advantageous embodiment a method receives a response signal in response to a transmission of an interrogation signal into the structure. The response signal is decomposed into a first plurality of modes. The first plurality of modes is compared to a second plurality of modes for a comparison signal to form a comparison. A change index is assigned to the response signal using the comparison.

11 Claims, 7 Drawing Sheets

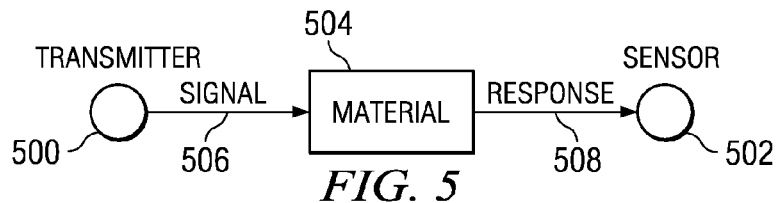
FIG. 5
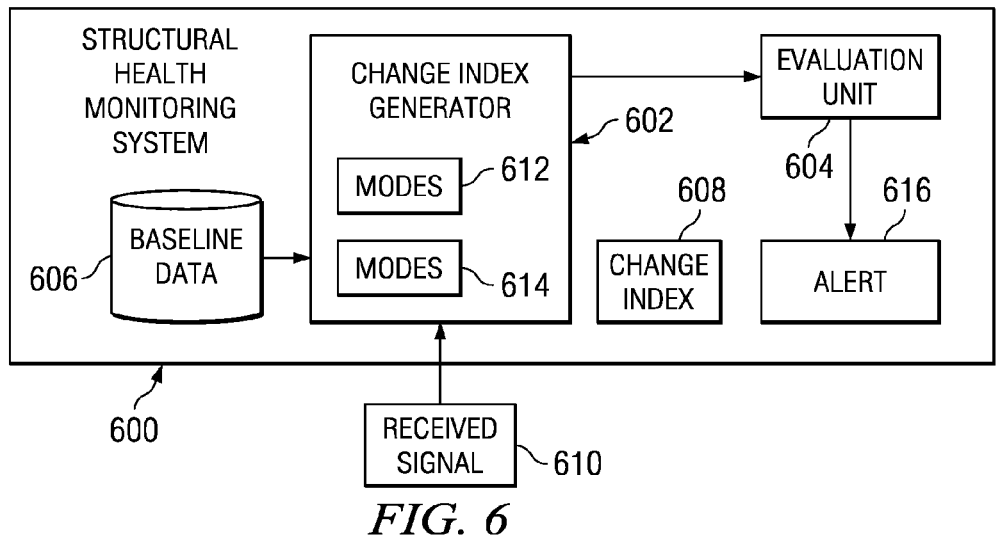
FIG. 6
| Unchanged Case | Ref Shift 1 = 520 | Ref Shift 2 = 662 | Ref Shift 3 = 852 | Matches |
|---|---|---|---|---|
| Cmp Shift 1 = 521 | 1 | 0 | 0 | 1 |
| Cmp Shift 2 = 662 | 0 | 1 | 0 | 1 |
| Cmp Shift 3 = 853 | 0 | 0 | 1 | 1 |
| Total Matches | | | | 3 |
FIG. 15
| Changed Case | Ref Shift 1 = 520 | Ref Shift 2 = 662 | Ref Shift 3 = 852 | Matches |
|---|---|---|---|---|
| Cmp Shift 1 = 534 | 0 | 0 | 0 | 0 |
| Cmp Shift 2 = 664 | 0 | 0 | 0 | 0 |
| Cmp Shift 3 = 846 | 0 | 0 | 0 | 0 |
| Total Matches | | | | 0 |
FIG. 16

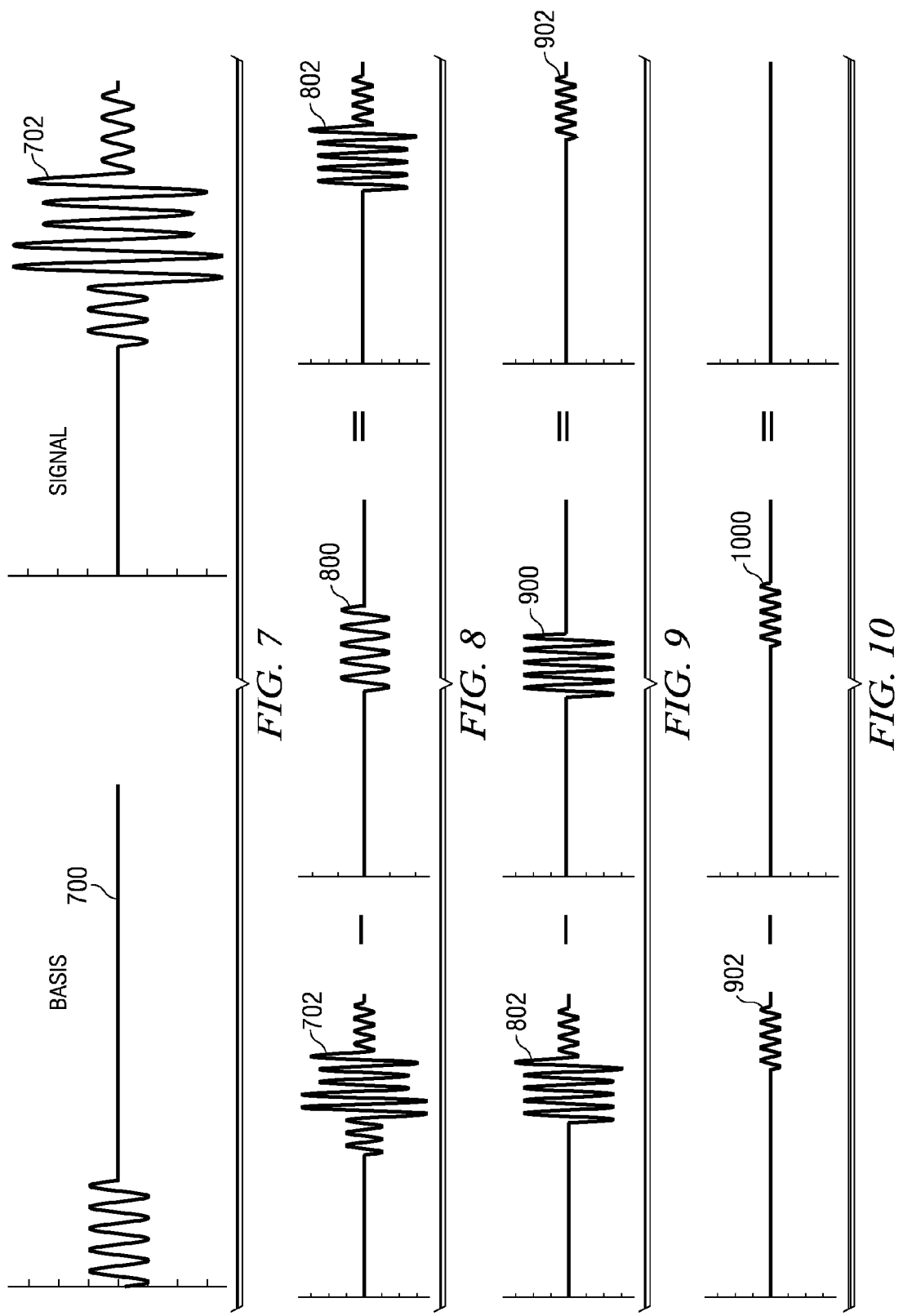

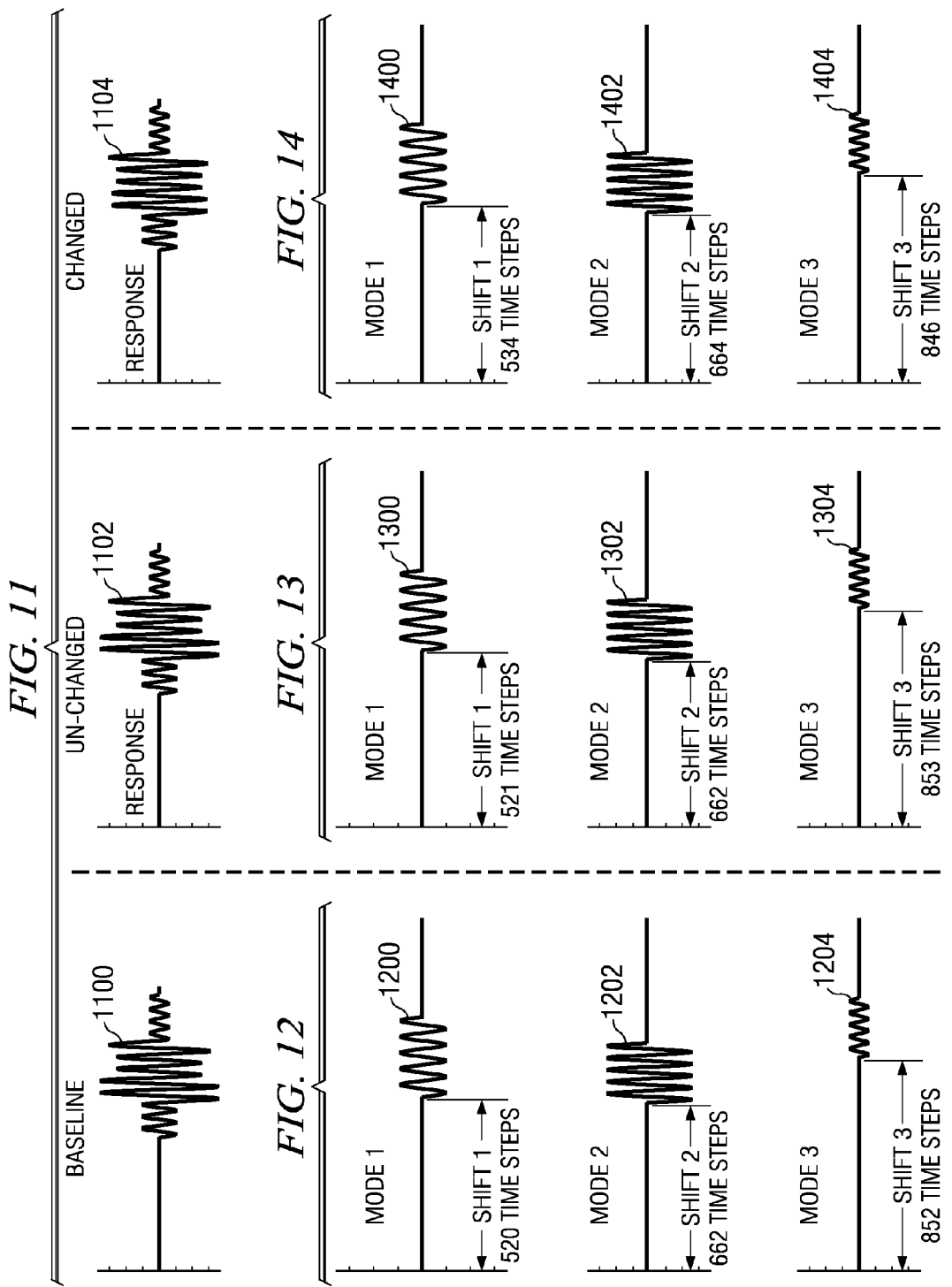

DECOMPOSITION MODE MATCHING CHANGE INDEX

BACKGROUND INFORMATION

1. Field

The present disclosure relates generally to processing data and in particular to processing data from responses of a material to an input wave form. Still more particularly, the present disclosure relates to a method, apparatus, and computer usable program code for identifying anomalies in a structure.

2. Background

Composite and metallic aircraft structures may be susceptible to internal changes that may occur from fatigue, impacts, and other events or conditions. Composite materials typically have a minimal visual indication of these types of changes. As a result, an aircraft may be inspected to access the integrity of the structure on a periodic basis, or after visual indications of surface anomalies, such as dent and scratch.

For example, impacts to a structure, such as an aircraft, may occur during cargo loading and unloading. Inspections of the structure of an aircraft may be time consuming and costly in terms of the time and skill needed to perform the inspection. Further, an airline may incur lost revenues from the aircraft being out of service.

Structural health monitoring techniques have been developed and used to monitor materials and structures. These techniques often build the health monitoring systems into the structures. These health monitoring systems may be used to determine whether changes have occurred to these materials and structures over time.

Sudden changes in environments, such as electromagnetic effects, mechanical stresses, and other environmental effects may affect the integrity of various materials and structures over time. By having health monitoring systems built into or associated with the structures to monitor the structures during use, appropriate measures and responses may be taken to prevent catastrophic failures and may prolong the life span of these structures.

The monitoring of structures may include various non-destructive elevation methods, such as ultrasonic testing or x-ray testing. Ultrasonic testing uses contact-based transducers to mechanically scan a structure. These distributed sensors and actuators may be surface mounted on the structure or may be embedded in the structure to generate and propagate control of diagnostic signals into the structure being monitored.

A structural health monitoring system is based on using a transmitter and a sensor configuration to transmit waveforms at various frequency ranges and acquire data from the responses. Often times, transducers may function both as a transmitter and a sensor. Although structural health monitoring systems may provide an automated on board system for detecting characterizing anomalies or changes that may require maintenance, these types of systems may provide for false indications that further inspection and/or maintenance may be needed. For example, different environments, such as different temperatures, may result in incorrect comparisons and results.

Therefore, it would desirable to have a method and apparatus that overcomes the problems described above.

SUMMARY

The advantageous embodiments provide a method, apparatus, and computer usable program code for identifying change indices for a structure. In one advantageous embodiment, a method receives a response signal in response to a transmission of an interrogation signal into the structure. The response signal is decomposed into a first plurality of modes. The first plurality of modes is compared to a second plurality of modes for a comparison signal to form a comparison. A change index is assigned to the response signal using the comparison.

In another advantageous embodiment, an apparatus comprises a structure, a set of transmitters, and a set of sensors. The structure has a plurality of components. The set of transmitters is physically associated with the plurality of components, wherein the set of transmitters is capable of sending signals into the plurality of components. The set of sensors is physically associated with the plurality of components. The set of sensors is capable of detecting responses to the signals, and structural health monitoring system in communication with the set of transmitters and the set of sensors. The structural health monitoring system is capable of causing a transmitter in the set of transmitters to send a signal into a component within the plurality of components in which the signal has a frequency range that falls within a selected frequency range to form a transmitted signal; receiving a response to the transmitted signal from a sensor in the set of sensors to form a received signal, decomposing a response signal into a first plurality of modes; comparing the first plurality of modes to a second plurality of modes for a comparison signal to form a comparison; and assigning a change index to the response signal using the comparison.

In yet another advantageous embodiment, a computer program product contains program code on a computer readable medium. Program code is present for receiving a response signal in response to a transmission of an interrogation signal into the structure. Program code is also present for decomposing the response signal into a first plurality of modes. Program code is also present for comparing the first plurality of modes to a second plurality of modes for a comparison signal to form a comparison. Program code is present for assigning a change index to the response signal using the comparison.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 5 is a diagram illustrating signal transmission and detection in accordance with an advantageous embodiment;

FIG. 6 is a diagram of a structural health monitoring system in accordance with an advantageous embodiment;

FIGS. 7-14 are diagrams illustrating the decomposing of a reference signal in accordance with an advantageous embodiment;

FIG. 15 is a table illustrating a comparison of modes for a comparison signal and a response signal in accordance with an advantageous embodiment;

FIG. 16 is a table illustrating a matrix for comparing modes in accordance with an advantageous embodiment;

DETAILED DESCRIPTION

Figure 1:
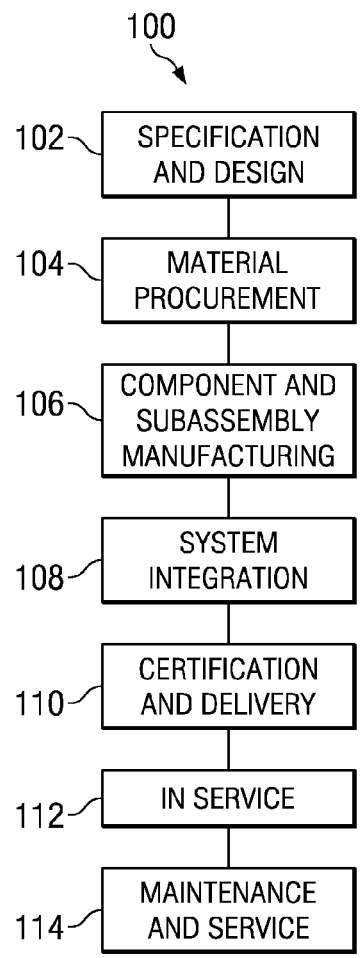
FIG. 1 is a diagram illustrating an aircraft manufacturing and service method in which an advantageous embodiment may be implemented.
Figure 2:
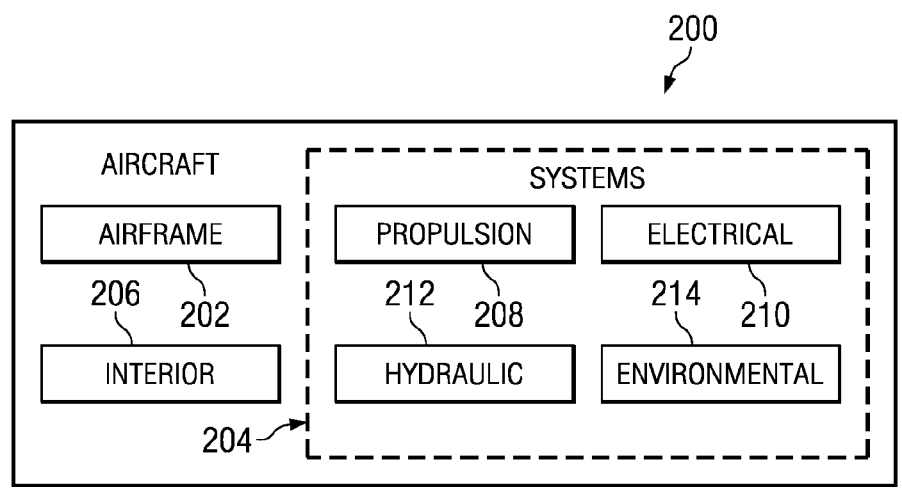
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

In one illustrative example, health monitoring systems of the advantageous embodiments may be implemented during component sub-assembly manufacturing 106 in system integration 108. In other advantageous embodiments, health monitoring systems may be added or implemented during maintenance and service 114. In these different advantageous embodiments, these health monitoring systems may include methods and apparatus for identifying anomalies in a structure in which change indices are identified during monitoring.

Figure 3:
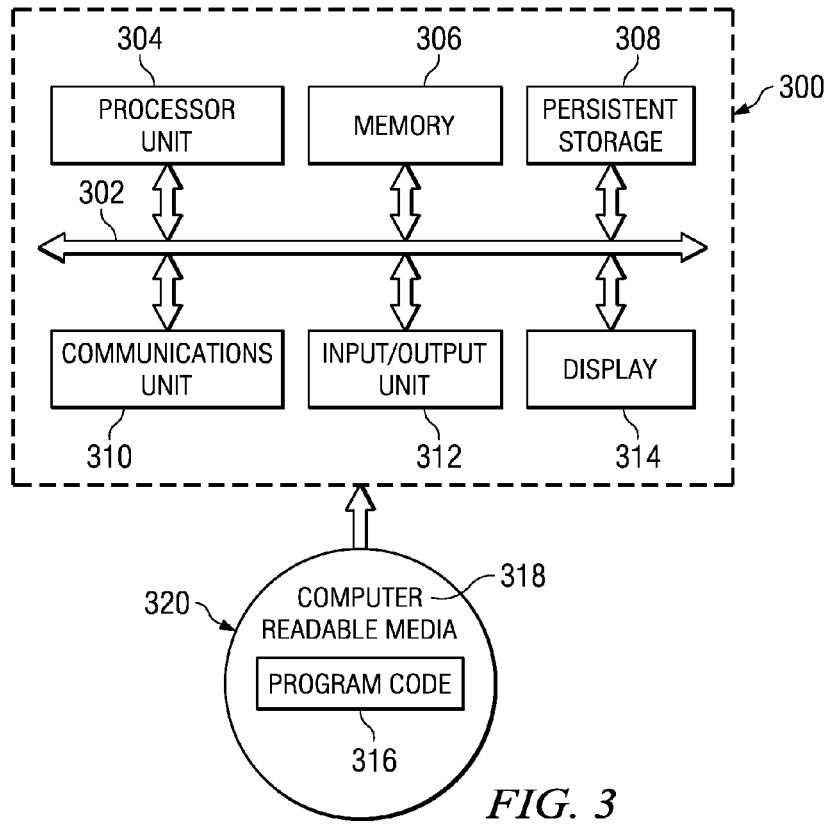
FIG. 3 is a diagram of a data processing system in accordance with an advantageous embodiment.

Turning now to FIG. 3, a diagram of a data processing system is depicted in accordance with an advantageous embodiment. In these examples, data processing 300 may implement processes to identify change indices in accordance with advantageous embodiments. These change indices may be used to determine whether an anomaly or change is present in a structure. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device.

Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples.

In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus, or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 306 or a cache such as found in an interface and memory controller hub that may be present in communications fabric 302.

The different advantageous embodiments recognize that signals recorded for a structure in a pristine, initial, or some other prior state may be made in a particular environment. For example, this data may be recorded for a particular temperature, pressure, humidity, or other suitable environment parameter. This data may be referred to as baseline data or a baseline signal.

In monitoring the structure after the signals have been recorded for the initial or prior state, an interrogation signal may be sent through the structure to obtain a response signal under an environment that is different from the one in which the baseline signal was obtained. If no changes have occurred in the structure, the different advantageous embodiments recognize that the baseline signal may be different from the response signal because of environmental differences from when the baseline signal was recorded and the comparison signal was obtained.

The different advantageous embodiments recognize that these differences cause false indications as to whether changes in the structure have occurred. For example, the different advantageous embodiments recognize that current processes for comparing these signals may be temperature sensitive. Differences in temperature during the acquisition of the baseline signal and the temperature in which the response signal is obtained may be different even though changes in the structure have not occurred. These differences may result in an indication that a change in the structure has occurred.

Thus, the different advantageous embodiments provide a method, apparatus, and computer usable program code for identifying changes in a manner that may be insensitive to environmental changes. In the different advantageous embodiments, change indices may be identified for a structure. A change index also may be referred to as a damage index, in some cases, depending on the particular implementation. A change index is used to indicate what amount of change has occurred in the characteristic structure between the baseline form of the structure and the current form of the structure.

In these illustrative examples, a higher value for the change index indicates a higher likelihood that a change may have occurred in the structure. A threshold value may be compared to the change index to determine whether additional inspection or maintenance may be required for a particular structure.

In the different advantageous embodiments, a response signal is received in response to a transmission of an interrogation signal into the structure. The response signal is decomposed into a first plurality of modes. The first plurality of modes is compared to a second plurality of modes for a comparison signal to form the comparison. This comparison signal may be the baseline signal, or some other signal received for the structure at a prior time. A change index may be assigned to the response signal using the comparison.

This change index may then be analyzed to determine whether a change in the structure is present.

Figure 4:
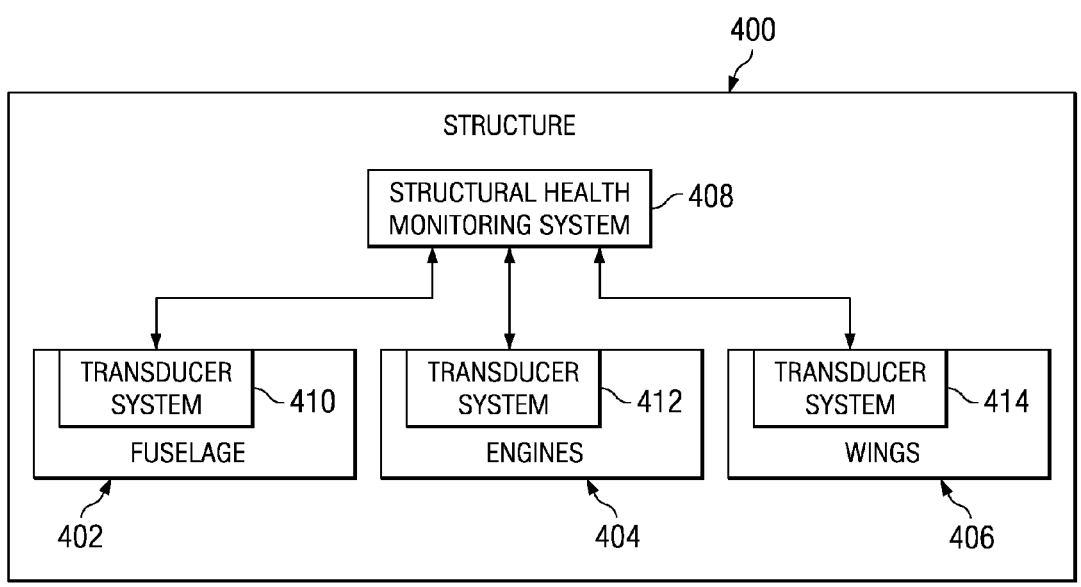
FIG. 4 is a diagram illustrating components used for structural health monitoring in a structure in accordance with an advantageous embodiment.

Turning now to FIG. 4, a diagram illustrating components used for structural health monitoring in a structure is depicted in accordance with an advantageous embodiment. Structure 400 is an example of a structure in which a health monitoring system may be implemented. Structure 400 may take many forms, such as an aircraft, a car, a tank, a ship, a submarine, a spacecraft, a dam, a building, a bridge, or some other suitable structure.

In this example, structure 400 takes the form of an aircraft. Structure 400 includes fuselage 402, engines 404, and wings 406. Other components also may be found in structure 400, but only these depicted ones are presented for purposes of illustrating different features in the different advantageous embodiments.

Structure 400 also includes structural health monitoring system 408, transducer system 410, transducer system 412, and transducer system 414. Although transducers are used for transmitters and sensors, in these examples, any type of transmitter, sensor, or device that is capable of sending and detecting signals at the frequencies needed to transmit the signals into a material may be used.

Structural health monitoring system 408 may be implemented in structure 400 using a data processing system, such as data processing system 300 in FIG. 3. Structural health monitoring system 408 may take the form of software, hardware, or a combination of software and hardware. In this example, structural health monitoring system 408 is implemented in software using a data processing system, such as data processing system 300 in FIG. 3.

Transducer systems 410, 412, and 414 are examples of transmitters and sensors that may be implemented in structure 400 to transmit signals and detect responses to those signals. In these examples, the transducers in these systems are "associated" with the particular components in structure 400. A transmitter or sensor, such as those in transducer systems 410, 412, and 414, may be physically associated with the component by being attached to the component or even embedded within the component. In these examples, the transducers are fixed transmitters and fixed sensors that are not moved once they are placed.

In this depicted example, transducer system 410 is a set of one or more transducers that is placed onto or within fuselage 402. Transducer system 410 may be attached to surfaces within fuselage 402 or may be embedded into the materials itself, depending on the particular implementation.

The different transducers within transducer system 410 are arranged to be capable of monitoring one or more areas within fuselage 402. These areas may be selected based on different factors, such as identifying areas in which damage may cause a failure within fuselage 402. In a similar fashion, transducer system 412 is attached to or integrated with components in engines 404. Transducer system 414 also is integrated and configured to collect data from one or more areas in wings 406.

Transducer systems 410, 412, and 414 are controlled by structural health monitoring system 408. Structural health monitoring system 408 may send signals for transmission by these transducer systems. Further, the responses received in response these signals are returned to structural health monitoring system 408 for processing. The responses collected from transducer systems 410, 412, and 414 are compared to baseline or comparison signals.

The illustration of structure 400 in FIG. 4 is presented for the purposes of explaining one advantageous embodiment. This illustration is not meant to limit the manner in which different advantageous embodiments may be implemented or embodied. For example, in other advantageous embodiments, other numbers of transducer systems may be present. For example, structure 400 may include five, ten, twenty, or some other suitable number of transducer systems depending on the particular implementation. Also, additional structural health monitoring systems, in addition to structural health monitoring system 408, also may be present for redundancy.

Turning now to FIG. 5, a diagram illustrating signal transmission and detection is depicted in accordance with an advantageous embodiment. In this example, transmitter 500 and sensor 502 may be used to test material 504. Transmitter 500 and sensor 502 are an example of a transmitter and sensor that may be found in transducer system 410 in FIG. 4. Material 504 is an example of a material that may be present in a structure, such as fuselage 402 or wings 406 in FIG. 4.

Transmitter 500 transmits or sends signal 506 into material 504. Signal 506 is a waveform having a selected frequency range. Response 508 is detected by sensor 502. Response 508 is generated in response to the transmission of signal 506 into material 504. Although, in this example, sensor 502 is shown as receiving response 508 on an opposite side of material 504 from transmitter 500, sensor 502 may be located on the same side of material 504 as transmitter 500. With this configuration, response 508 is detected from reflections or scattering of signal 506 being transmitted into material 504.

Response 508 is used, in these different illustrative examples, in a comparison with a prior response to determine whether changes have occurred in material 504. These changes may be anomalies that occur through various stresses and other environmental conditions to which material 504 is subjected to over time.

With reference now to FIG. 6, a diagram of a structural health monitoring system is depicted in accordance with an advantageous embodiment. In this example, structural health monitoring system 600 is an example of one implementation of structural health monitoring system 408 in FIG. 4. As illustrated, structural health monitoring system 600 includes change index generator 602, evaluation unit 604, and baseline data 606.

Change index generator 602 creates change index 608 by comparing baseline data 606 to received signal 610. In these examples, baseline data 606 may take the form of signals generated in response to interrogating the structure at a prior point in time. These signals may also be referred to as comparison signals, in these illustrative examples. This prior point in time may be at a time when the structure was first manufactured. Of course, baseline data 606 may contain signals for other points in time after creation of the structure.

Change index generator 602 generates modes 612 from the signal obtained from baseline data 606. Additionally, change index generator 602 also generates modes 614 from received signal 610. These different modes are compared to each other by change index generator 602 to create change index 608. Change index generator 602 then sends change index 608 to evaluation unit 604.

Evaluation unit 604 processes change index 608 to determine whether the change is sufficient to generate alert 616. Alert 616 may be a visual and/or audio alert presented on a user interface. In other advantageous embodiments, alert 616 may be a message that is sent to another system. This system may be located in the structure or remotely. Further, different levels of alerts may be generated by evaluation unit 604. In some cases, alert 616 may indicate that maintenance or a full inspection may be needed at a later point in time. In other cases, alert 616 may indicate that immediate action may be needed to prevent unwanted performance in the structure to occur.

In the different advantageous embodiments, the decomposing of comparison signals in baseline data 606 into modes 612, and the decomposing of received signal 610 into modes 614 for comparison reduces and/or eliminates problems that may occur from different operating environments. For example, with this illustrative example, the comparison of these modes may be insensitive to temperature differences from when baseline data 606 was collected and from the temperature at which received signal 610 was collected.

With reference now to FIG. 7, a diagram illustrating the decomposing of a reference signal is depicted in accordance with an advantageous embodiment. In this example, basis signal 700 and reference signal 702 are shown. Basis signal 700 may be scaled and/or shifted to identify different modes within reference signal 702. This scaling and/or shifting may be performed to match or approximate the form of a portion of reference signal 702.

In FIG. 8, basis signal 800 is subtracted from reference signal 702. Basis signal 800 is a scaled and/or shifted version of basis signal 700 and is an example of one mode for reference signal 702. This signal is a simpler signal, as compared to reference signal 702. This subtraction results in signal 802, which is the resulting signal when basis signal 800 has been removed from reference signal 702.

In FIG. 9, basis signal 900 is formed through scaling and/or shifting and is subtracted from signal 802 to form signal 902. Basis signal 900 is another mode for reference signal 702 in these examples. In FIG. 10, signal 1000 is formed based on a scaled and/or shifted version of basis signal 700. Basis signal 1000 is subtracted from basis signal 900 with no portion of reference signal 702 remaining. Basis signal 1000 forms a third mode for reference signal 702.

Basis signals 800, 900, and 1000 form the signals for the different modes. These signals may be summed to reform reference signal 702 in FIG. 7. In this example, only three modes are illustrated for purposes of depicting one manner in which a decomposition process may occur. In other advantageous embodiments, other modes may be obtained from the reference signal. For example, twenty modes, thirty modes, or some other suitable number of modes may be selected. A similar process may be performed for the comparison signals, as well as the reference signals.

With reference now to FIG. 11, a diagram illustrating signals obtained by interrogating a structure is depicted in accordance with an advantageous embodiment. In this example, signal 1100 represents a baseline or comparison signal. Signal 1102 represents a response signal for an unchanged structure, while signal 1104 represents a response signal from a changed structure.

With reference now to FIG. 12, a diagram illustrating a mode for signals is depicted in accordance with an advantageous embodiment. In this example, signals 1200, 1202, and 1204 represent different modes for signal 1100 in FIG. 11. In these examples, signal 1200 represents mode one, signal 1202 represents mode two, and signal 1204 represents mode three. As can be seen, these signals may be obtained by sifting and scaling a basis signal to match a portion of signal 1100 in FIG. 11.

With reference now to FIG. 13, a diagram illustrating modes for a response signal is depicted in accordance with an advantageous embodiment. In this example, signals 1300, 1302, and 1304 represent three different modes for signal 1102 in FIG. 11. Signal 1300 represents mode one, signal 1302 represents mode two, and signal 1304 represents mode three.

In FIG. 14, signals 1400, 1402, and 1404 represent signals for three modes for signal 1104 in FIG. 11. In this example, signal 1400 represents mode one, signal 1402 represents mode two, and signal 1404 represents mode three.

A determination may be made as to whether different modes match each other by comparing the modes for the different signals to each other. For example, decomposed signals 1200, 1202 and 1204 may be compared to signals 1300, 1302, and 1304. These signals may also be compared to 1400, 1402 and 1404. Similar comparisons may be made between different modes or different responses.

With reference now to FIG. 15, a table illustrating a comparison of modes for a comparison signal and a response signal is depicted in accordance with an advantageous embodiment. In table 1500, the signal is a comparison signal, such as signal 1102 in FIG. 11. In other words, signal 1102 is the comparison signal. In this example, signal 1102 is a response signal obtained from interrogating the structure.

In this illustrative example, the columns are for the different modes for a reference signal, signal 1100, while the rows represent the modes for the comparison signal, signal 1102 in FIG. 11. In this particular example, three matches between the modes are present. These three matches may indicate that no changes have been detected in the structure. A match may be present if two modes match each other exactly or within some threshold. Some differences in amplitude or period may occur with a match still being present. The threshold used or differences allowed may vary depending on the particular implementation. In one advantageous embodiment, a threshold of one shift is used. Other thresholds may be determined empirically for a specific application in other embodiments.

In FIG. 16, a table illustrating a matrix for comparing modes is depicted in accordance with an advantageous embodiment. In table 1600, a reference signal, such as signal 1100 may be compared to a comparison signal, such as signal 1104 by comparing the different modes. The columns represent the modes for the reference signal, signal 1100, while the rows represent the modes for the comparison signal, signal 1104. In this example, no matches are present. This number of matches may indicate that changes to the structure have occurred.

In performing matches with a high number of decomposed signals, such as twenty signals, the first four matches may occur in the same order due to the size of decomposition pieces. Later matches with small amplitude decomposition pieces may change the order. This use of a matrix in which all modes are compared to other modes may handle shifts that may occur out of order.

Figure 17:
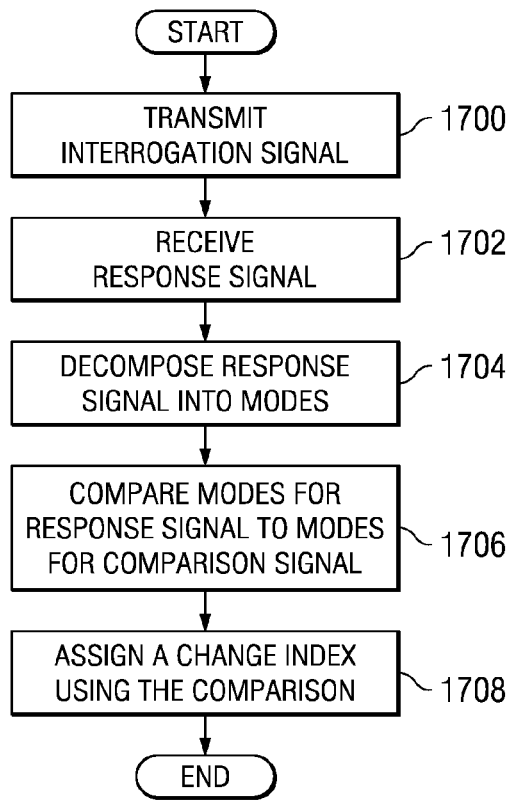
FIG. 17 is a flowchart of a process for assigning a change index in accordance with an advantageous embodiment.

With reference now to FIG. 17, a flowchart of a process for assigning a change index is depicted in accordance with an advantageous embodiment. The process illustrated in FIG. 17 may be implemented in a health monitoring system, such as structural health monitoring system 600 in FIG. 6.

The process begins by transmitting an interrogation signal (operation 1700). This interrogation signal is transmitted using a transducer system, such as transducer system 410 in FIG. 4 into a structure, such as fuselage 402 in FIG. 4. The process receives a response signal (operation 1702). This response signal may be received at the same transducer system or a different transducer system depending on the particular implementation.

The process decomposes the response signal into modes (operation 1704). All of these modes may be recombined to recreate the response signal. The decomposition, in operation 1704, may be a process of converting a complex signal into a number of simpler signals.

A number of different methodologies and techniques are currently available to decompose signals. In these illustrative examples, the response signal may be decomposed into a sum of shifted and scaled versions of the input signal in which each version is referred to as a mode.

This process may be accomplished by cross correlating the input and output signals. At the point or shift of greatest correlation, the sensor signal may be divided by the input signal to obtain a scaling factor. The shifted and scaled input signal may then be subtracted from a sensor signal. This process may be repeated until a selected threshold is reached or a fixed number of decomposition signals have been produced.

This type of decomposition may be performed for an input wave form h(t) and sensor data x(t). The sensor data x(t) may be approximated as follows:

$$x(\tau) = \sum_{i=1}^{N} w_i h_i(\tau) = \sum_{i=1}^{N} w_i h\left(\frac{t - \tau_i}{s_i}\right)$$

$x(\tau)_i$ approximation of $x(i)$

Where $h_i(\tau)_i$ shifted $\tau_j$ and scaled $w_i$ Input $h(i)$ $s_i$ frequency constant, assumed 1

$\tau_i$ $W_i$ will be searched by cross correlation and reducing the residual error The residual at the $i^{th}$ step is as follows:

$$r_i(t) = r_{i-1}(t) - a_i h_i(t)$$

where $r_0 = x(t)$

This illustration of decomposing a signal into different modes is not meant to limit the manner in which a signal may be decomposed into different modes. Other advantageous embodiments may use other available decomposition methodologies or techniques.

The process compares the modes for the response signal to the modes for the comparison signal (operation 1706). The comparison signal may be any signal previously received in response to the transmission of the interrogation signal. The process assigns a change index using the comparison (operation 1708), with the process terminating thereafter. In these different illustrative examples, the change index may be assigned based on the number of matches between modes. For example, the change index may be as follows:

$$CI = 1.3^{-N}$$

Where CI is the change index and N is the number of matches between modes. In the preferred embodiment, this formula is appropriate for a twenty mode decomposition.

Figure 18:
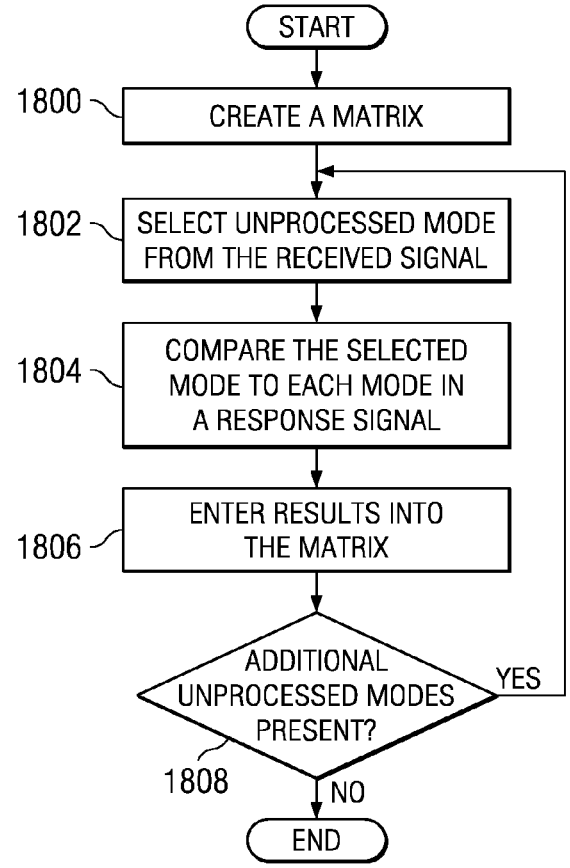
FIG. 18 is a flowchart of a process for comparing modes in accordance with an advantageous embodiment.

Turning now to FIG. 18, a flowchart of a process for comparing modes is depicted in accordance with an advantageous embodiment. The process illustrated in FIG. 18 is a more detailed illustration of operation 1706 in FIG. 17.

The process begins by creating a matrix (operation 1800). This matrix cross references the modes in the response signal to the modes in the received signal. An unprocessed mode from the received signal is selected (operation 1802). The selected mode is compared to each mode in the response signal (operation 1804). In some advantageous embodiments, the mode may be compared only to a corresponding mode in the response signal.

The process enters the results into the matrix (operation 1806). A determination is made as to whether additional unprocessed modes are present (operation 1808). If additional unprocessed modes are present, the process returns to operation 1802. Otherwise, the process terminates.

Figure 19:
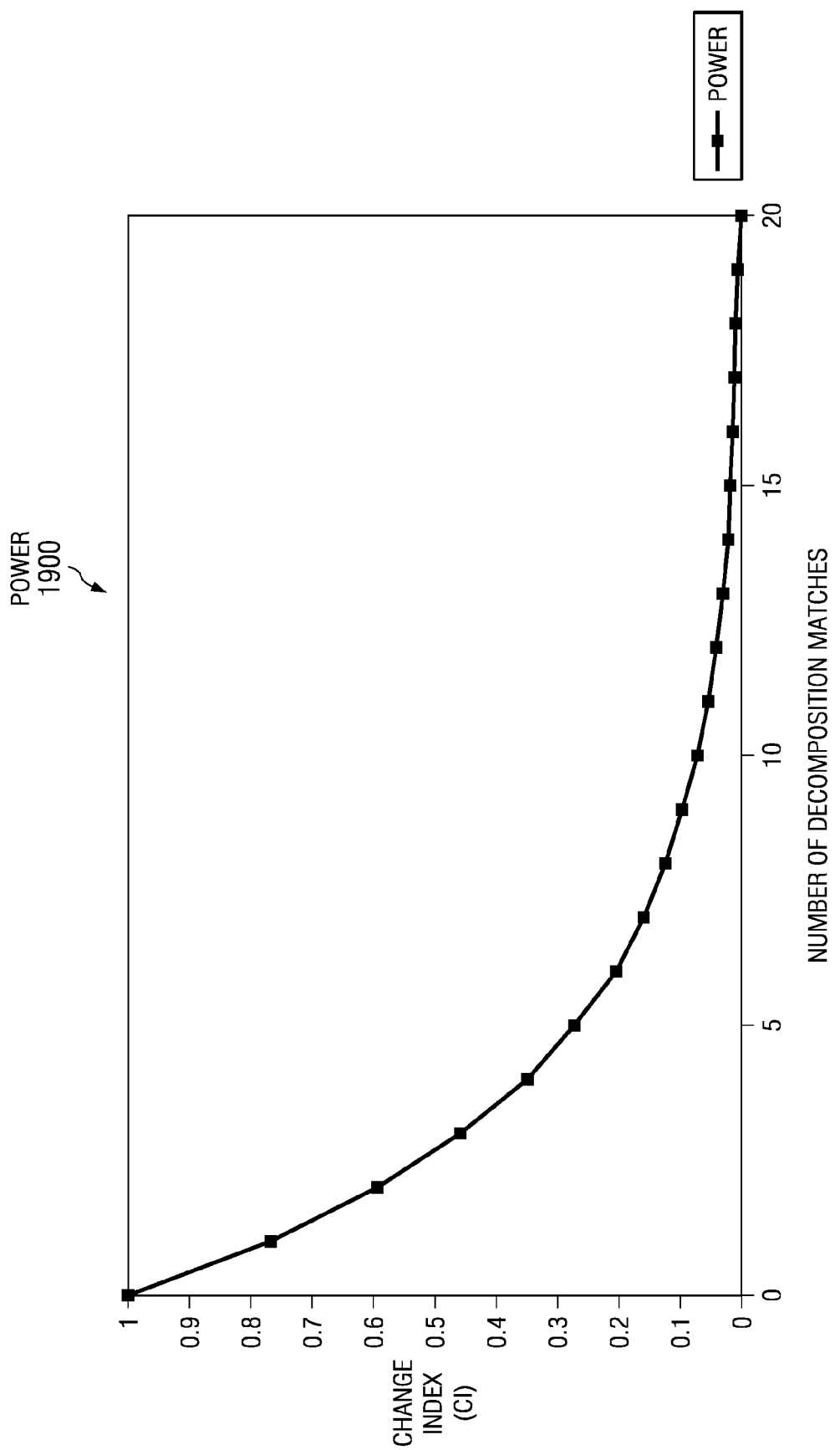
FIG. 19 is a graph illustrating change indexes in accordance with an advantageous embodiment.

With reference now to FIG. 19, a graph illustrating change indices is depicted in accordance with an advantageous embodiment. In this example, graph 1900 is an example of a graph in which change indices are shown on the y axis and the number of matches is shown on the x axis. Graph 1900 may be used in operation 1708 in FIG. 17 to assign a change index based on the comparison made in operation 1706 using the process in FIG. 18.

Thus, the different advantageous embodiments provide a method, apparatus, and computer usable program code for identifying change indices for a structure. In the different advantageous embodiments, a response signal may be received in response to a transmission of an interrogation signal into a structure. The reference signal is decomposed into a first plurality of modes. This first plurality of modes is compared to a second plurality of modes for a comparison signal to form a comparison. A change index may then be assigned using the comparison.

In this manner, the different advantageous embodiments look at individual modes rather than an entire response. Further, these modes may be identified as specific Lamb wave modes providing an ability to compare these individual modes to better identify changes or anomalies in a structure. Further, the different advantageous embodiments have a feature in which the comparisons may be insensitive to temperature changes. As a result, compensations due to temperature variations do not need to be performed.

Further, the different advantageous embodiments also provide a correlation with a delamination area. A delamination area is an area of a composite structure in which the layered plies that make up the composite become separated from one another. These delaminations may be caused by a hard object impacting the composite part. In the different advantageous embodiments, a 0.83 linear correlation factor may be present, which may be around 30 percent better than other change indices currently used. In other words, the change factor becomes larger as the delamination area becomes larger.

As a result, in the different advantageous embodiments, a sizing of the change of the structure also may be identified in addition to indicating whether a change in the structure has occurred. As a result, with the change indices, a high value relative to a lower value indicates that the path of the signal is near and/or passes through a change in the structure.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying change indices for a structure, the method comprising:
    receiving a response signal in response to a transmission of an interrogation signal into the structure;
    decomposing the response signal into a first plurality of modes wherein each mode in the first plurality of modes is a time shifted and magnitude scaled version of the interrogation signal, and wherein each mode of the first plurality of modes is within the same frequency band;
    comparing, by a processor, the first plurality of modes to a second plurality of modes for a comparison signal to form a comparison; and
    assigning a change index to the response signal using the comparison.

2. The method of claim 1, wherein the decomposing step comprises:
    converting the response signal into a plurality of simpler signals, wherein summing the plurality of simpler signals forms the response signal.

3. The method of claim 1, wherein each mode in the first plurality of modes is a time shifted and magnitude scaled version of the interrogation signal.

4. The method of claim 1, wherein the comparing step comprises:
    comparing the each mode in the first plurality of modes with a mode in the second plurality of modes to form a plurality of comparisons; and
    assigning a value to each of the plurality of comparisons to form a plurality of values.

5. The method of claim 1 further comprising:
    transmitting the interrogation signal from a transducer into the structure to form the transmission.

6. The method of claim 1, wherein the response signal is received by the transducer.

7. The method of claim 1, wherein the structure is selected from one of an aircraft, a building, a dam, a submarine, a spacecraft, a ship, a truck, a tank, a bridge, or a wall.

8. The computer implemented method of claim 1, wherein each mode of the first plurality of modes is within the same frequency band.

9. The method claim 4, wherein the value is a logic value indicating whether a match is present between the each mode in the first plurality of modes and the corresponding mode in the second plurality of modes.

10. The method of claim 9, wherein the step of assigning a change index to the response signal using the comparison comprises:
    assigning the change index using a number of matches.

11. The method of claim 10, wherein the change index is assigned as follows:

$$CI = 1.3^{-n}$$

where CI is the change index and n is the number of matches.

* * * * *